United States Patent [19]

Logus et al.

[11] 4,010,830
[45] Mar. 8, 1977

[54] PLANETARY WHEEL DRIVE WITH ACCESSIBLE LOW-TORQUE DISC BRAKES

[75] Inventors: Anthony T. Logus, Chicago; Ronald W. Barnhart, Elmhurst, both of Ill.

[73] Assignee: Pettibone Corporation, Chicago, Ill.

[22] Filed: Apr. 11, 1975

[21] Appl. No.: 567,238

[52] U.S. Cl. .................................. 192/4 A; 74/785; 180/43 B; 188/18 A; 188/71.1; 188/71.5
[51] Int. Cl.² .................... F16H 57/10; B60K 29/02
[58] Field of Search ................ 74/760, 761, 781 R, 74/785, 786, 792, 801; 180/43 B, 70 R, 75; 188/18 A, 71.1, 71.5; 192/4 A, 4 R

[56] References Cited

UNITED STATES PATENTS

| 3,157,239 | 11/1964 | Bernotas | 180/43 B |
|---|---|---|---|
| 3,707,207 | 12/1972 | Kondo | 188/71.5 |
| 3,754,625 | 8/1973 | Voth et al. | 192/4 A |
| 3,756,095 | 9/1973 | McCay, Jr. | 180/43 B |
| 3,834,498 | 9/1974 | Ashfield et al. | 192/4 A |
| 3,892,300 | 7/1975 | Hapemann et al. | 180/65 F |

FOREIGN PATENTS OR APPLICATIONS

| 261,892 | 5/1964 | Australia | 188/18 A |

*Primary Examiner*—C. J. Husar
*Attorney, Agent, or Firm*—Darbo, Robertson & Vandenburgh

[57] ABSTRACT

In a planetary wheel drive, disc braking is provided with the discs located outwardly of the gearing so as to be readily accessible for servicing. One set of discs is splined to the drive shaft, rotating faster than the wheel by the factor of the gear ratio, so that advantages comparable to all those advantages heretofore attained by high ratio planetary wheel braking are still attained, with the accessibility here achieved.

4 Claims, 1 Drawing Figure

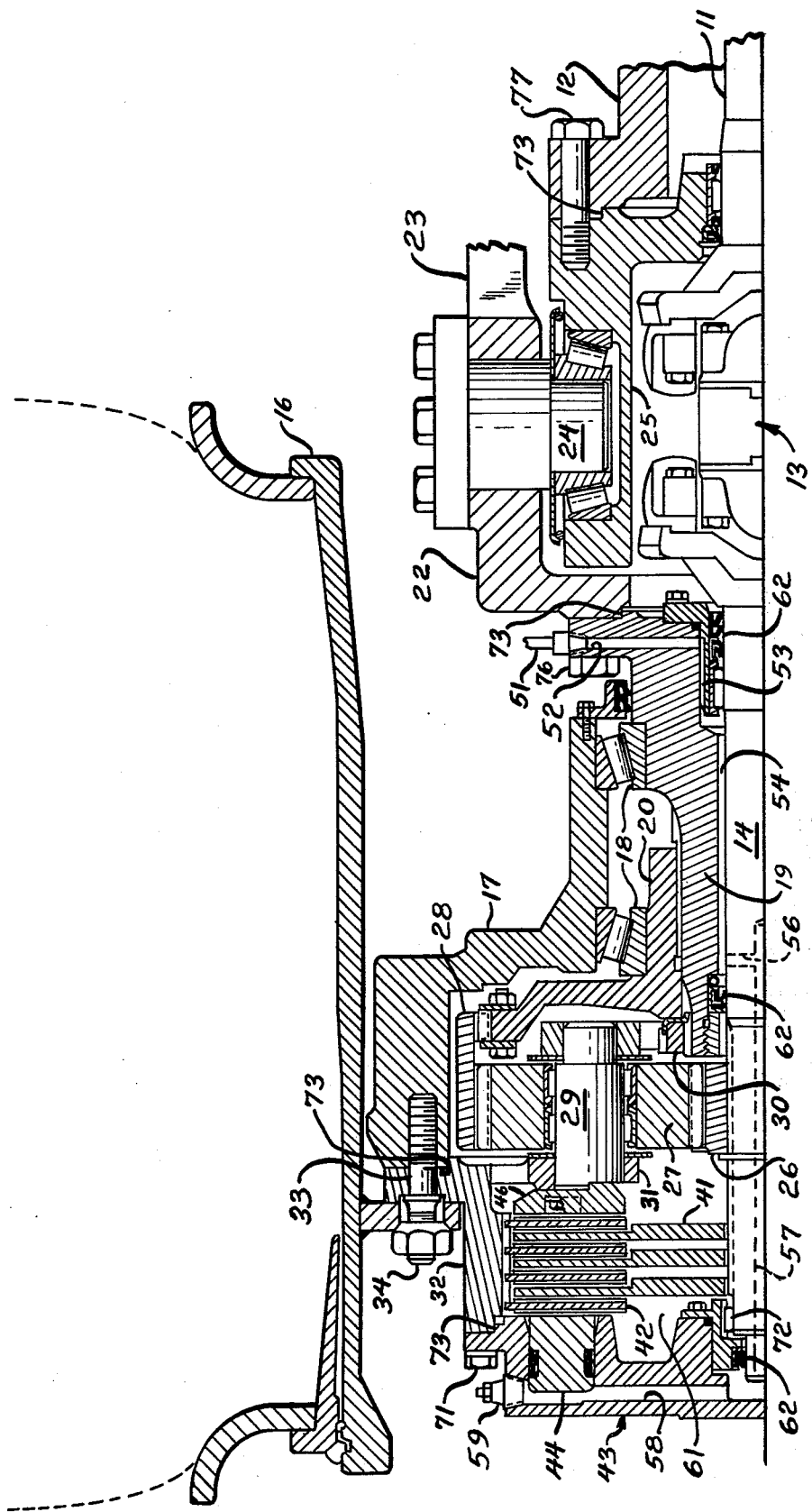

PLANETARY WHEEL DRIVE WITH ACCESSIBLE LOW-TORQUE DISC BRAKES

INTRODUCTION

The invention to which the present disclosure is offered for public dissemination in the event that adequate patent protection is available relates to braking for planetary wheel drives. Planetary wheel drives or final drives are commonly used in trucks and other heavy-duty vehicles and may have a gear ratio of the order of 5 to 1 which is considered very advantageous. Wheels driven in this manner may be steerable wheels, and in that event the driving torque which must be transmitted through the necessary universal joints and the drive system to the axle is reduced by the said gear ratio.

Disc brakes have been proposed for such planetary wheel drives theretofore, and in at least some instances have been of high ratio nature because of braking the sun gear, but they have not been accessible for servicing without removing the planetary gears. One such patent with braking discs located axially behind the planetary gearing is Voth et al U.S. Pat. No. 3,754,625 and another is Ashfield U.S. Pat. No. 3,834,498. In both of these one set of discs is splined to the sun gear, providing ratio-reduced disc-torque. In both of these, however, access to the brake discs necessitated rather complete disassembly of the gear housing, as well as removal of the wheel.

According to the present invention, the discs are located axially outwardly from the wheel gearing, and within a housing formed by the wheel hub so that access to the discs is easily achieved without removing the wheel or removing the peripheral portion or shell of the housing. It is merely necessary to remove a housing end-cover, and with it the outer wheel bearing and the hydraulic actuator for the disc brakes. Both sets of discs are then readily slipped out. One set of discs is externally splined to the peripheral shell of the brake housing, which rotates with the wheel, and the other set is splined to the drive shaft so that the wheel drive-ratio is applicable between the sets of discs. The brake discs thus have higher relative speed and are subjected to a correspondingly reduced torque. Although the advantages which result are not new with the present invention, their achievement is made more practical by the present invention in making servicing easier. Whatever increased braking capability or increased reliability resulted from the same ratio before is here retained. Heavy-duty equipment has sometimes been plagued with destructive brake torques. For example, a lining or facing may be pulled loose or crumbled. It is not contended that there would be any reduction in the amount of heat developed, or in the total amount of wear. However, the brake housing is a continuation of the gear housing and is thoroughly sealed from the hydraulic brake applicator so that the discs may run in oil and heat transfer from the discs to the housing for dissipation to the atmosphere enhanced.

The advantages and features of the invention will be more apparent from the following description and from the drawings.

CHARACTERIZATION OF THE DRAWING

The single FIGURE of the drawing is a fragmentary vertical axial sectional view, illustrating a preferred form of the present invention in connection with a steerable planetary wheel-drive. The showing is only above the axis because lower parts would be mere duplication. Some lines, especially background circumferential lines, are omitted for simplicity.

BACKGROUND DESCRIPTION

Although the following disclosure, offered for public dissemination in the event adequate patent protection is available, is detailed to ensure adequacy and aid understanding, this is not intended to prejudice that purpose of a patent which is to cover each new inventive concept therein no matter how others may later disguise it by variations in form or additions or further improvements. The claims at the end thereof are intended as the chief aid toward this purpose, as it is these that meet the requirement of pointing out the parts, improvements, or combinations in which the inventive concepts are found.

In many respects, the illustrated steerable planetary wheel-drive is conventional. Thus the axle 11, or the shaft in axle housing 12, drives a universal joint 13 which permits steering and which in turn drives spindle 14 serving in effect as the end portion of axle 11. It would be the end portion of axle 11 if steering were not provided.

The wheel or rim 16 is carried by a wheel-ring 17 rotatably mounted through roller bearing sets 18 on tubular inner hubs 19 and 20.

The hub 20 is in turn firmly mounted on steering knuckle 22 which can be swung for steering by steering arm 23. The swinging action is permitted, and adequate strength of support provided, by steering pins 24 and their bearings and housing 25.

The wheel is driven by a sun gear 26 splined to spindle 14 and meshing with planetary gear 27 which in turn mesh with ring gear 28 which is nonrotatively carried by hub 20, splined to inner hub 19. A threaded ring 30 adjusts bearing snugness. It is thus apparent that the planetary gears 27, of which there will usually be three or four, must orbit about spindle 14. Each planetary gear 27 rotates on a sturdy pin 29, of course with suitable rolling bearings.

Inasmuch as planetary gears 27 orbit, it follows that their support pins 29 must also orbit. Each support pin 29 is rigid with the wheel structure. For the purpose of the present invention it is sufficient to point out that the outer ends of the pins 29 are carried by a formation 31 which may be part of or secured to shell casting 32 secured to the wheel ring 17 by the shank portion 33 of wheel mounting studs 34.

As is conventional, spindle 14 rotates several times for one rotation of wheel 16 which it drives. A wide variety of driving ratios can be provided depending upon the respective numbers of teeth on gear 26, 27 and 28. The driving torque for which spindle 14 and its drive must be suitable is thus reduced (ignoring friction) by the driving ratio, as compared to the torque required to turn wheel 16. This reduction of the driving torque required of spindle 14 not only permits the use of a slightly smaller diameter spindle, but also relieves the upstream driving elements. This is especially desirable in connection with a steerable wheel inasmuch as there are important advantages in having the universal joints 13 subjected only to the much smaller torques.

ACCESSIBLE HIGH RATIO DISC BRAKING

According to the present invention, disc braking for wheel 16 is provided by discs located outwardly of the gears 26, 27 and 28 so as to be readily accessible, these discs applying their braking action directly between the rotating wheel structure and the spindle 14 rotating with the sun gear 27 so that the high ratio is effective with respect to the braking as well as with respect to the drive. Thus, a suitable number of inner brake discs 41 are shown splined directly to spindle 14 and are engaged by outer discs 42 which are splined on the inner face of housing casting 32. As an alternative construction, if that illustrated might be deemed not sturdy enough, sun gear 26 could be extended outwardly, with its teeth (or other splines of even larger radius) serving to engage the teeth of the inner discs 41.

A cap 43, bolted to housing shell 32, carries and cooperates with an annular brake applying piston 44, which is hydraulically movable to apply the braking pressure between the discs. Thus all of the discs are slidably mounted and can slide toward the anvil ring 46, bolted to formations 31 on the casting 32.

Hydraulic fluid for actuating piston 44 is supplied by a hydraulic brake line 51 through radial passage 52, clearances 53 and 54, radial passage 56, bore 57 and radial passages 58. A hydraulic bleed valve 59 is provided to let air out and to facilitate replacing old fluid with clean fluid.

It will be apparent that the structure already described provides a sealed brake chamber 61, so that a disc-oil can be provided for "wet" braking and cooling.

Whether or not the disc-oil is provided, it is important to keep the hydraulic fluid from leaking out of its intended channels. Accordingly, at the three points 62 concerned with sealing against the rotating spindle 14, and exposed to the hydraulic fluid, a very high quality of rotary seal should be used. Typically these seals may be V-shaped seals with the open end of the V exposed to the brake fluid pressure and with the inner flange tensioned against the spindle by an annular coil spring. Seals of this V-shaped nature, with or without such a spring, should also be carried by piston 44 for engaging the walls along which the piston slides. At most stationary joints where leakage could occur, O-ring seals are sufficient.

For servicing the disc brakes, it is merely necessary to remove the circle of screws 71, holding cap 43 in place, and lift off the cap together with the parts that come with it. All of the discs are then free to be slipped off for replacement or relining. Inasmuch as these parts are all independent of the load-carrying line between wheel 16 and axle housing 12, it does not appear that there is even need to apply a jack to the car for this operation. Bearings 72 merely support the weight of the outer end of spindle 14, discs 41 (which are being removed) and sun gear 26. If spindle 14 droops slightly, it will resume its proper place when cap 43 is restored. Accurate positioning of all parts on the axis is ensured by snug telescopic fits at the various joints 73, and by a proper bearing adjustment by ring 30.

ACHIEVEMENT

From the foregoing it is seen that with planetary wheel-drive, disc braking has been provided which is readily accessible for removable and replacement of the discs merely by removing a cap, which may run in oil, and which provides a high ratio of braking comparable to that of the planetary drive. The great accessibility would be of tremendous advantage even without the other features. The "wet" brakes and high ratio braking are not new, but whatever advantages they have had heretofore are retained. No assertion is here made that the high ratio reduces the development of heat in braking or the amount of surface wear which results. However, it does reduce the torque to which the brake discs are subjected and this permits engineering design with somewhat less rugged construction than might otherwise be needed, and may avoid some instances of more sudden destruction than wear, as by tearing linings apart or loose from their backings. In case it might be recognized that the reduced torque of the brake discs would have to be offset by increased forces and possibly increased wear at some point such as on the ring teeth, this may be true. However, the two kinds of tooth wear which could be significant because they result from the usual forward movement, namely braking wear and drive wear, will occur on opposite faces of the teeth. Hence no reduction in gear life is expected. Of course, teeth must be rugged and the ring gear 28 must be ruggedly anchored; possibly more ruggedness being required than is required for driving. However, ring gear 28 is splined to the ring gear hub member 20 which in turn is splined to inner hub 19, which is secured by successive multitudes of screws 76 and 77, so that adequate anchoring sturdiness can surely be provided.

The accessibility of the discs provided by this invention may make disc braking really practicable for the first time, with planetary wheel-drive.

We claim:

1. A readily accessible disc braking system for wheels with planetary wheel-drive, in which an axial drive spindle extending outwardly from its bearing carries a sun gear which drives planetary gears meshing on the inside of a stationary ring gear, the planetary gears rotating on orbiting pins moving with the wheel; said brake system being characterized by:

outer brake disc means located axially outwardly from said gears and removably locked to rotate with the wheel, inner brake disc means in braking engagement with the outer disc means during braking, and removably locked to rotate with the spindle, a removable cap located outwardly of the brake disc means, mounted to rotate with one of said brake disc means, and carrying hydraulic actuating means for the disc means, the removal of said cap giving access to said disc means and providing an opening adequate for disc-replacement; said brake disc means, when braking secures their respective rotative parts against relative movement, causing a lock-up of the planetary gears with the stationary ring gear.

2. A readily accessible disc braking system according to claim 1, in which the respective brake disc means are splined to their respective carriers.

3. A readily accessible disc braking system for wheels with planetary wheel-drive, in which an axial drive spindle extending outwardly from its bearing carries a sun gear which drives planetary gears meshing on the inside of a stationary ring gear, the planetary gears rotating on orbiting pins moving with the wheel; said brake system being characterized by:

a shell mounted to rotate with the wheel and extending axially outwardly from the ring gear, outer brake disc means within and removably locked to the inner face of said shell, inner brake disc means in braking engagement with the outer disc means during braking, and removably locked to structure rotating with the spindle, a removable cap closing the outer end of said shell, carrying hydraulic actuating means for the discs; the removal of said cap giving access to said disc means and providing an opening adequate for disc-replacement; said brake disc means, when braking secures their respective rotative parts against relative movement, causing a lock-up of the planetary gears with the stationary ring gear.

4. A readily accessible disc braking system for wheels with planetary wheel-drive, in which an axial drive spindle extending outwardly from its bearing carries a sun gear which drives planetary gears meshing on the inside of a stationary ring gear, the planetary gears rotating on orbiting pins moving with the wheel; said brake system being characterized by:

a shell mounted to rotate with the wheel and extending axially outwardly from the ring gear, outer brake disc means within and removably locked to the inner face of said shell, inner brake disc means in braking engagement with the outer disc means during braking, and removably locked to structure rotating with the spindle, a removable cap closing the outer end of said shell, carrying hydraulic actuating means for the discs; the removal of said cap giving access to said disc means and providing an opening adequate for disc-replacement; said brake disc means, when braking secures their respective rotative parts against relative movement, causing a lock-up of the planetary gears with the stationary ring gear;

said cap and shell forming a sealed chamber for containing oil in which said discs will run and be cooled.

* * * * *